May 18, 1943.   A. KALTENBACH   2,319,328
ANGLE PIECE
Filed April 17, 1940
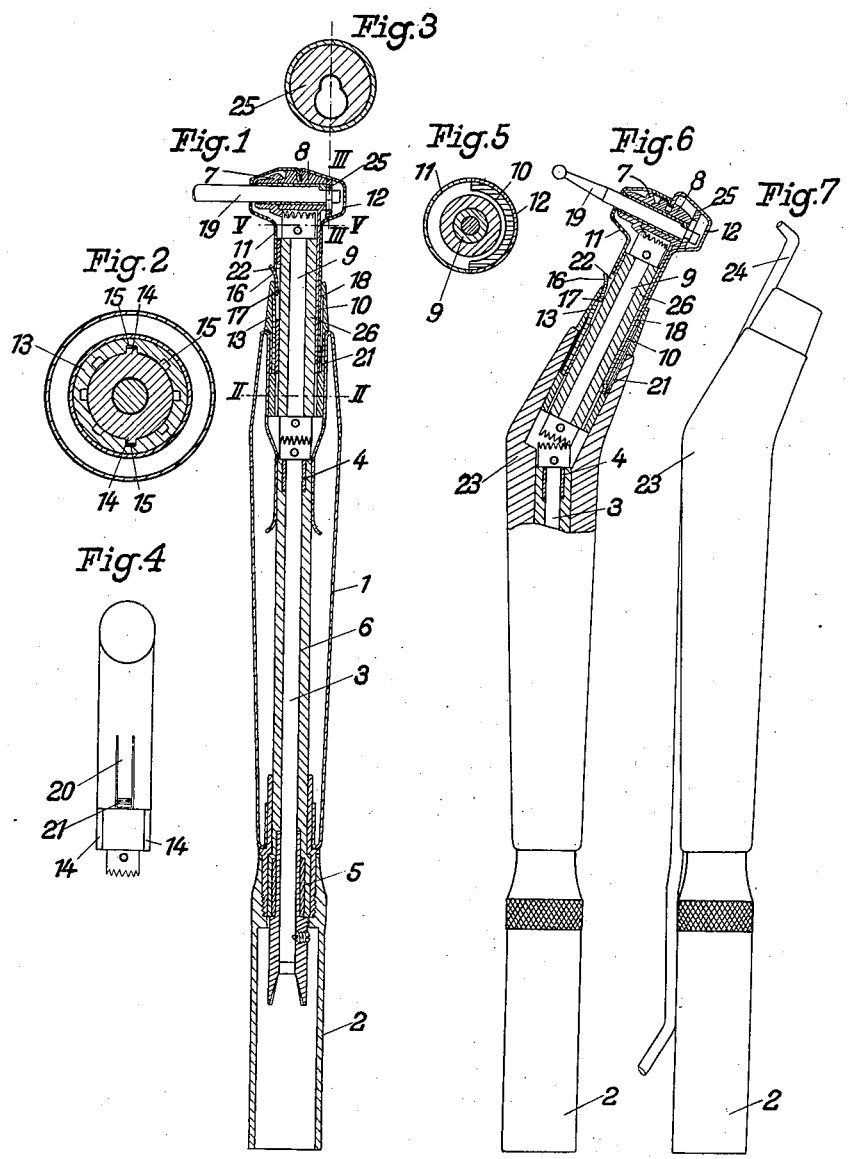
Inventor:
ALOIS KALTENBACH,
BY Bailey & Larson
ATTORNEYS Patented May 18, 1943

2,319,328

UNITED STATES PATENT OFFICE 2,319,328

ANGLE PIECE

Alois Kaltenbach, Potsdam, Germany; vested in the Alien Property Custodian

Application April 17, 1940, Serial No. 330,188
In Germany May 26, 1939

4 Claims. (Cl. 32—27)

This invention relates to angle-pieces, especially for dental drills which eventually may be provided with a knee-shaped handle of the form of a grip-sleeve.

It has already been proposed to construct angle-pieces for dental drills or the like in such a way that the handle or grip-sleeve may easily be detached from the angle-piece.

It is likewise known to arrange the head of the angle-piece detachably from the handle or grip-sleeve so that the middle and upper drive may be taken out of the head-member. If these head-members are sterilized, it will be necessary to again oil the bearings when inserting the drives.

My invention has for its object primarily to devise an angle-piece, especially for dental drills and more particularly an angle-piece provided with a knee-shaped grip-sleeve in such a manner that all exposed parts may be readily detached and that after sterilization of said parts no oiling of the bearings will be necessary.

According to my invention I propose to arrange the upper, middle and under drive forming part of the angle-piece together with their bearings within easily detachable covering sleeves.

In a preferred construction according to my invention the upper and the middle drive together with their bearings are covered up by means of two shells which on their part are detachably connected with the front end of the straight or knee-shaped grip-sleeve. In such case the grip-sleeve as such may easily be removed in known manner from the under drive and its bearings. Preferably the bearings for the upper and the under drive are either made in one piece or mounted in a common support.

A further feature of my invntion consists therein that the rear covering shell is constructed to serve simultaneously as a drill-spindle support, in which case it may also be fastened as a separate part in the rear covering shell, as for instance, by brazing or soldering.

The front covering shell is preferably locked upon the grip-sleeve by means of a leaf-spring having a projection engaging in a groove in said grip-sleeve. This leaf-spring may also form a part of the wall of said shell. In order to release the front covering shell from the grip-sleeve the leaf-spring may engage in a groove provided in the bearing or bearing support for the middle drive.

In locked condition of the front shell the rear shell may be displaced in direction of the middle drive permitting easy removal of the drill-spindle. Preferably the rear shell is likewise locked, when the drill-spindle is in fixed condition, such locking being effected by means of a spring provided on the grip-sleeve or on the bearing or bearing support for the middle drive.

In order to permit adjustment of the head member with respect to the grip-sleeve one or several ribs are provided at the under end of the bearing or bearing support for the middle drive, said ribs engaging in proper grooves in the grip-sleeve. The head-member which is provided with the covering shell is furthermore so constructed that it may selectively be inserted either into a straight or into a knee-shaped grip-sleeve. The knee-shaped grip-sleeve may also be made in one piece. Conduits for the supply of pressure-air, pressure-gas or water or conductors for the supply of electric current may also be provided on the grip-sleeve.

In the accompanying drawing I have represented some examples of angle-pieces forming part of my invention.

Fig. 1 is a longitudinal section through an angle-piece having a straight grip-sleeve, that is, an under and middle drive in alignment, Fig. 2 a cross-section along line II—II of Fig. 1, Fig. 3 a cross-section along line III—III of Fig. 1, Fig. 4 a rear-view of the rear covering shell removed from the grip-sleeve, Fig. 5 a cross-section along line V—V of Fig. 1, Fig. 6 a longitudinal view, partly in section, of the head-member shown in Fig. 1 inserted into the front end of a knee-shaped grip-sleeve, the rear covering shell being in raised position to permit removal of the drill-spindle, and Fig. 7 a view of a knee-shaped grip-sleeve provided with a conduit for the supply of pressure-air, pressure-gas or water to the drill-spindle.

As may be seen from the drawing, the under drive 3 together with the front bearing 4, the rear bearing 5 and the support 6 for both bearings may be withdrawn in rearward direction subsequent to unscrewing the bushing 2 which serves as a sliding connection.

The head of the straight or of the knee-shaped grip-sleeve comprises the upper drive 7, the bearing 8 for the upper drive, the middle drive 9, the bearing 26 for the middle drive, the bushing 10 surrounding said latter bearing, a front shell 11 and a rear shell 12, said shells covering up said upper and said middle drive as well as the bearings therefor. In the construction as shown the bearing 8 for the upper drive and the bushing 10 are made in one piece. The covering shells 11 and 12 are inserted into a bushing 13 which on its part is fixed to the front end of the grip-sleeve 1 which forms the handle of the device. The lower end of the bearing 26 for the middle drive is provided at opposite sides thereof with ribs 14 as shown in Fig. 2, said ribs engaging in corresponding grooves 15 in the bushing 13. In order to permit adjustment of the head with respect to the sleeve or handle 1 the bushing 13 is provided with grooves 15 throughout its periphery. Locking of said head on said sleeve or handle is effected by means of a leaf-spring 16 forming a part of the wall of the front covering shell. A projection 17 on the leaf-spring 16 engages in a groove 18 at the inner side of the bushing 13. The covering shell 12 is displaceable in direction of the middle drive 9, so that the drill-spindle 19 may be released from its support 25 inserted into the upper end of said middle drive. The drill-spindle support 25 is shown separately in Fig. 3. In order to also lock the rear covering shell in the bushing 13 in fixed condition of the drill-spindle, a part of the wall of said shell is likewise constructed as a leaf-spring 20 having a projection 21 engaging in a proper recess in the bushing 10.

From the drawing it may further be seen that the head may be taken out of the front end of the sleeve or handle by depressing the leaf-spring 16 into the groove 22. Upon removal of said head from said sleeve or handle the covering shells 11 and 12 may immediately be detached from the driving members and their bearings and both parts together with the sleeve or handle 1 may now be sterilized. It is of importance that the covering shells 11 and 12 and the sleeve or handle 1 which must both be sterilized do not comprise any bearing members whatever so that a straight or knee-shaped angle-piece, subsequent to sterilization, may again be composed without any oiling or bearing members.

In Fig. 6 there is shown the connection of a head constructed according to Figs. 1 to 5 with a knee-shaped grip-sleeve or handle. The locking of the two covering shells of the head is accomplished in the same manner as in the construction shown in Fig. 1. The head is furthermore adjustable in the knee-shaped grip-sleeve, the same as in the construction shown in Fig. 2. In Fig. 6 the rear covering shell 12 is shown in raised position in which the drill-spindle 19 is released from its support 25. As Fig. 6 shows, the knee-shaped grip-sleeve or handle is made in one piece.

Fig. 7 furthermore shows a knee-shaped grip-sleeve or handle according to Fig. 6, a conduit 24 being connected to the device for the supply of pressure-air, pressure-gas or water. This conduit may also be used for the reception of conductors for the supply of electric current and provided at its front end with an electric incandescent lamp serving for the illumination of the drill-spindle.

I claim:

1. An angle piece for dental drills comprising upper, middle and lower drive means, bearing means for said drive means, and a pair of readily detachable covering shells enclosing said upper and middle drive means and said bearing means therefor, said covering shells being detachably secured to and mounted in the forward end of said angle piece, and a bushing for said bearing of the middle drive means, said bearing means for said upper drive means and said bushing being formed of an integral unit.

2. An angle piece for dental drills comprising handle means, upper middle and lower drive means, bearing means for said drive means, a pair of readily removable covering shells detachably supported on the forward end of said handle means and covering said upper drive means and said upper bearing means and means detachably connecting said shells and said upper and middle bearing means, said shells comprising front and rear members, the means connecting the shell forming the front member to said handle means comprising a leaf spring affixed to the shell forming said front member, said leaf spring having an out-turned free end releasably engaging a groove provided in the handle means.

3. An angle piece for dental drills comprising handle means, upper, middle and lower drive means, bearing means for said drive means, a pair of readily removable covering shells detachably supported on the forward end of said handle means and covering said upper drive means and said upper bearing means, and means detachably connecting said shells and said upper and middle bearing means, said covering shells comprising front and rear members, the means detachably securing the shell forming said rear member comprising a leaf spring affixed to the shell forming said rear member, said leaf spring having an in-turned free end engaging a groove in said bearing means.

4. An angle piece for dental drills, comprising a head and hollow handle means, upper, middle and lower drive means carried by the head and handle means, upper, middle and lower bearing means for said drive means, the hollow handle means surrounding said middle and lower bearing means, said middle bearing means comprising a sleeve, a bushing forming an extension of said handle means fixed to the handle means at one end thereof, said bushing provided with grooves, said middle bearing means being removably inserted in said bushing, and means for adjusting the position of said head about the axis of said middle drive means comprising longitudinal ribs located on said sleeve near the end thereof inserted within the said bushing, said ribs being engaged by said grooves.

ALOIS KALTENBACH.